United States Patent
Nakanishi (10) Patent No.: US 12,129,980 B2
(45) Date of Patent: Oct. 29, 2024

(54) VEHICLE LAMP AND METHOD OF MANUFACTURING VEHICLE LAMP

(71) Applicant: KOITO MANUFACTURING CO., LTD., Tokyo (JP)

(72) Inventor: Yoshiyuki Nakanishi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/182,650

(22) Filed: Mar. 13, 2023

(65) Prior Publication Data

US 2023/0213160 A1 Jul. 6, 2023

Related U.S. Application Data

(63) Continuation of application No. PCT/JP2021/032946, filed on Sep. 8, 2021.

(30) Foreign Application Priority Data

Sep. 24, 2020 (JP) .................................. 2020-160187

(51) Int. Cl.
*F21S 41/19* (2018.01)
*F21S 41/25* (2018.01)

(52) U.S. Cl.
CPC .............. *F21S 41/192* (2018.01); *F21S 41/25* (2018.01)

(58) Field of Classification Search
CPC ................................. F21S 41/192; F21S 41/25
See application file for complete search history.

(56) References Cited

U.S. PATENT DOCUMENTS

| | | | |
|---|---|---|---|
| 11,168,848 B2 * | 11/2021 | Mertens | F21V 5/007 |
| 2007/0206369 A1 * | 9/2007 | Takeda | F21S 41/148 361/820 |
| 2009/0154185 A1 * | 6/2009 | Yagi | F21S 41/143 362/516 |
| 2012/0243250 A1 | 9/2012 | Yagi | |
| 2013/0250599 A1 * | 9/2013 | Owada | F21S 41/25 362/520 |
| 2016/0290587 A1 | 10/2016 | Nakagawa et al. | |
| 2017/0356628 A1 | 12/2017 | Lee | |

(Continued)

FOREIGN PATENT DOCUMENTS

| | | |
|---|---|---|
| CN | 101457889 A | 6/2009 |
| CN | 102345823 A | 2/2012 |

(Continued)

OTHER PUBLICATIONS

International Preliminary Report on Patentability Chapter I (PCT/IB/373) and Written Opinion (PCT/ISA/237) with translation dated Mar. 28, 2023 by The International Bureau of WIPO in corresponding Intl Patent Appln No. PCT/JP2021/032946. (9 pages).

(Continued)

*Primary Examiner* — Bryon T Gyllstrom
(74) *Attorney, Agent, or Firm* — BUCHANAN, INGERSOLL & ROONEY PC (57) ABSTRACT

A vehicle lamp includes a metal plate having a light source mounted thereon, a lens that light emitted from the light source enters and passes through to exit forward, and a holder that holds the lens. The metal plate and the lens are positioned to the holder.

4 Claims, 9 Drawing Sheets

(56) References Cited

U.S. PATENT DOCUMENTS

| | | | |
|---|---|---|---|
| 2018/0106445 A1* | 4/2018 | Okubo | F21S 41/265 |
| 2018/0156408 A1 | 6/2018 | Okubo | |
| 2019/0338930 A1* | 11/2019 | Spinger | H01S 5/02253 |
| 2019/0351817 A1 | 11/2019 | Yamamoto | |
| 2019/0353320 A1* | 11/2019 | Shikata | F21S 41/275 |
| 2020/0116323 A1* | 4/2020 | Nykerk | F21S 41/151 |
| 2020/0149701 A1* | 5/2020 | Monestier | F21S 41/322 |
| 2021/0231286 A1 | 7/2021 | Nakanishi et al. | |

FOREIGN PATENT DOCUMENTS

| | | |
|---|---|---|
| CN | 102798067 A | 11/2012 |
| CN | 107208861 A | 9/2017 |
| CN | 107636386 A | 1/2018 |
| CN | 111076137 A | 4/2020 |
| CN | 211203922 U | 8/2020 |
| DE | 102014104503 A1 | 10/2015 |
| JP | 2009146665 A | 7/2009 |
| JP | 2016139514 A | 8/2016 |
| JP | 2017139354 A | 8/2017 |
| JP | 2019204615 A | 11/2019 |
| WO | 2018158867 A1 | 9/2018 |

OTHER PUBLICATIONS

International Search Report (PCT/ISA/210) with translation mailed on Oct. 5, 2021 by the Japanese Patent Office as the International Searching Authority for International Application No. PCT/JP2021/032946. (4 pages).

Office Action (Notification of the First Office Action) issued on Jan. 15, 2024, in corresponding Chinese Patent Application No. 202111092419.0 and English translation of the Office Action. (17 pages).

Office Action (Notification of Reason(s) for Refusal) issued on Aug. 6, 2024, in corresponding Japanese Patent Application No. 2022-551852 and machine English translation of the Office Action. (5 pages).

Office Action (Notification of the Third Office Action) issued on Aug. 13, 2024, in corresponding Chinese Patent Application No. 202111092419.0 and English translation of the Office Action. (18 pages).

* cited by examiner

VEHICLE LAMP AND METHOD OF MANUFACTURING VEHICLE LAMP

BACKGROUND OF THE INVENTION

1. Field of the Invention

The present disclosure relates to vehicle lamps.

2. Description of the Related Art

To date, a lamp unit has been devised that reflects light emitted upward from a light source by a reflector in a forward direction and projects a light source image ahead of the vehicle via a convex projection lens with a portion of the reflected light that has not been cut by a shade and that has passed through the convex projection lens (see patent document 1). In this lamp unit, the convex projection lens is supported by a lens holder, the lens holder is supported by a base member extending rearward, and the base member supports a heat sink having a light source unit mounted thereon at a predetermined position.

patent document 1: JP2016-139514

In the lamp unit described above, however, the projection lens and the light source unit are spaced apart from each other, and many members are interposed between the projection lens and the light source unit. Accordingly, there is room for improvement in the accuracy of positioning the projection lens and the light source unit.

SUMMARY OF THE INVENTION

A vehicle lamp according to one aspect of the present disclosure includes a substrate having a light source mounted thereon, a lens that light emitted from the light source enters and passes through to exit forward, and a holder that holds the lens. The substrate and the lens are positioned to the holder.

Any optional combination of the constituent elements above or an embodiment obtained by converting what is expressed by the present disclosure among a method, an apparatus, a system, and so on is also effective as an embodiment of the present disclosure.

It is to be noted that any arbitrary combination or rearrangement of the above-described structural components and so forth is effective as and encompassed by the present embodiments. Moreover, this summary does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

A vehicle lamp according to one aspect of the present disclosure includes a substrate having a light source mounted thereon, a lens that light emitted from the light source enters and passes through to exit forward, and a holder that holds the lens. The substrate and the lens are positioned to the holder.

According to this aspect, the substrate and the lens are positioned to the holder, the common member, and thus the accuracy of positioning the substrate and the lens improves.

The lens may be provided within a region on one side of an opening in the holder where the substrate is located; and the lens may include a center portion that refracts the light from the light source to allow the light to exit forward, and an outer edge portion surrounding the center portion, the outer edge portion being to internally reflect the light emitted from the light source and having entered the outer edge portion to allow the light to exit forward. With this configuration, the lens does not protrude from the holder, as a convex lens does, and thus the thickness of the vehicle lamp in the front-back direction of the vehicle can be reduced.

The holder may include a flange portion surrounding the opening. The lens may be secured to a positioning portion provided on an inner side of the flange portion. This configuration allows the lens to be mounted from the back side of the holder to be positioned.

The substrate may be a metal plate having a thickness of 1-2 mm, and the metal plate may be exposed on one surface thereof opposite a surface on which the light source is mounted. This configuration can reduce the thickness of the vehicle lamp in the front-back direction of the vehicle.

Another aspect of the present disclosure provides a method of manufacturing a vehicle lamp. This method includes preparing a tubular holder having an opening that allows light from a light source to exit therethrough; positioning a lens to a positioning portion so formed on an inner side of the opening as to surround the opening; and positioning a substrate having the light source mounted thereon to a securing portion opposite the opening in the holder. The positioning of the lens and the positioning of the substrate are performed through welding by laser emitted from the same side.

According to this aspect, the positioning of the lens and the positioning of the substrate can be achieved through welding by laser emitted from the same side, and this can reduce the necessity for changing the orientation of a laser welding apparatus or for rotating components, such as the lens or the holder, during the manufacture.

Hereinafter, some embodiments for implementing the present invention will be described in detail with reference to the drawings. In the description of the drawings, identical elements are given identical reference characters, and duplicate description thereof will be omitted, as appropriate. The configurations described below are illustrative in nature and do not in any way limit the scope of the present invention.

First Embodiment

[Vehicle Lamp]

Figure 1:
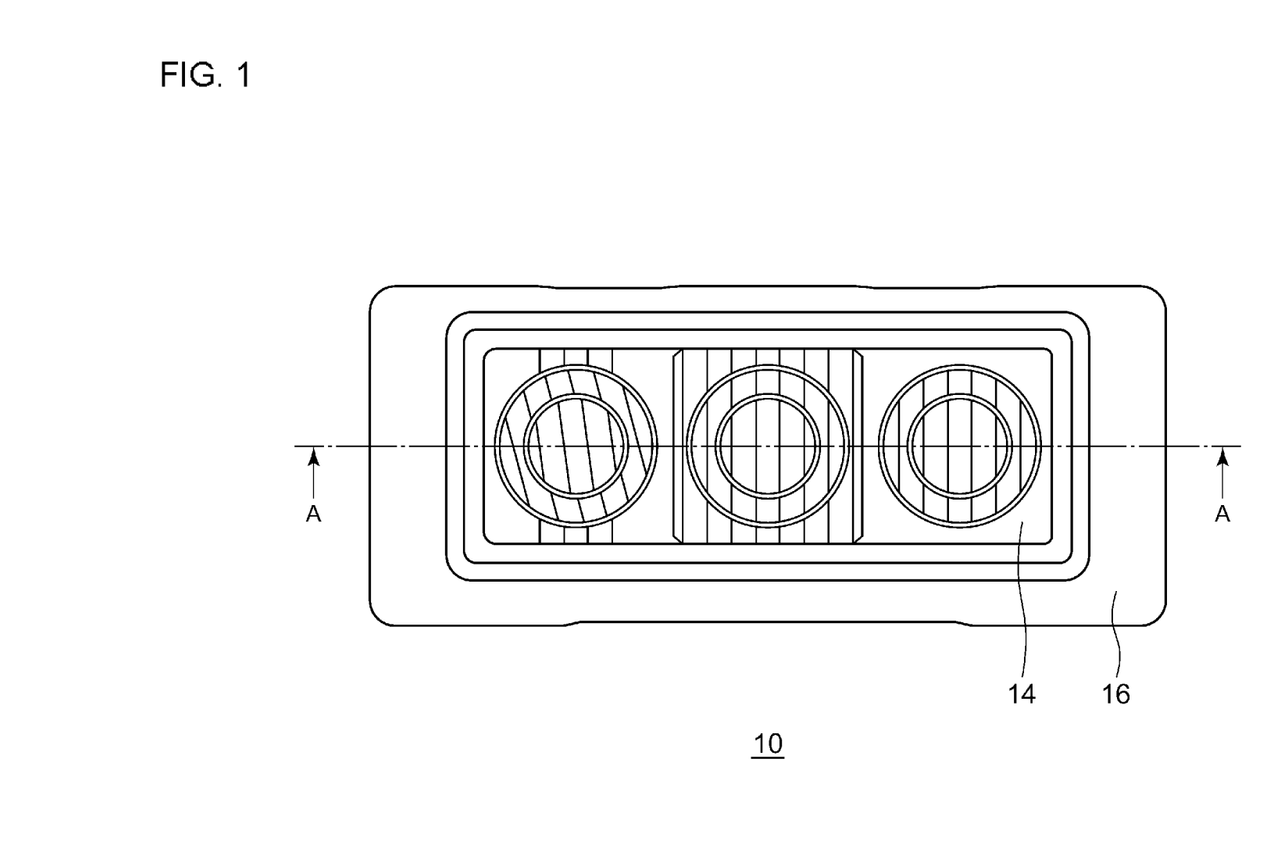
FIG. 1 is a front view of a vehicle lamp according to a first embodiment.
Figure 2:
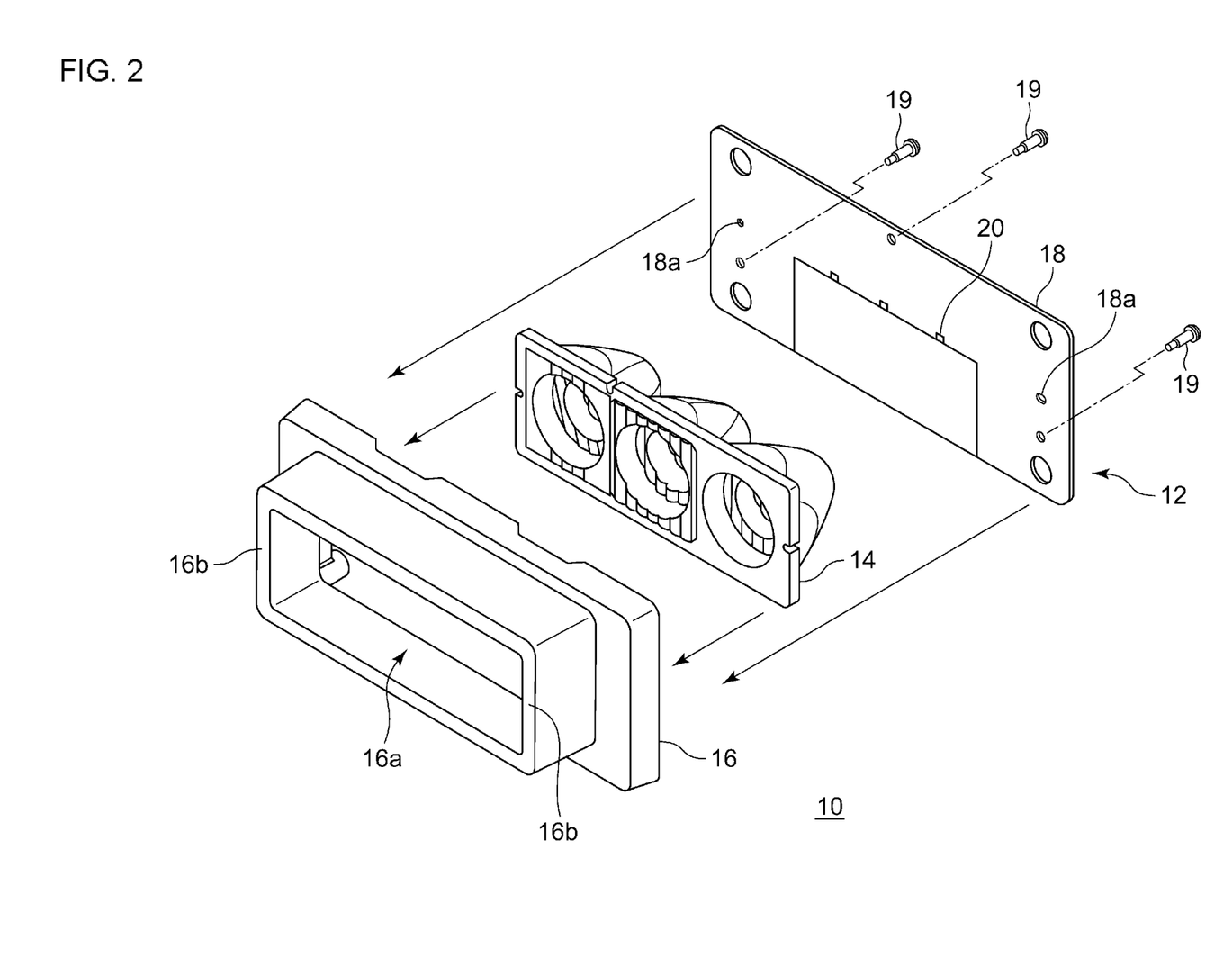
FIG. 2 is an exploded perspective view of the vehicle lamp according to the first embodiment.
Figure 3:
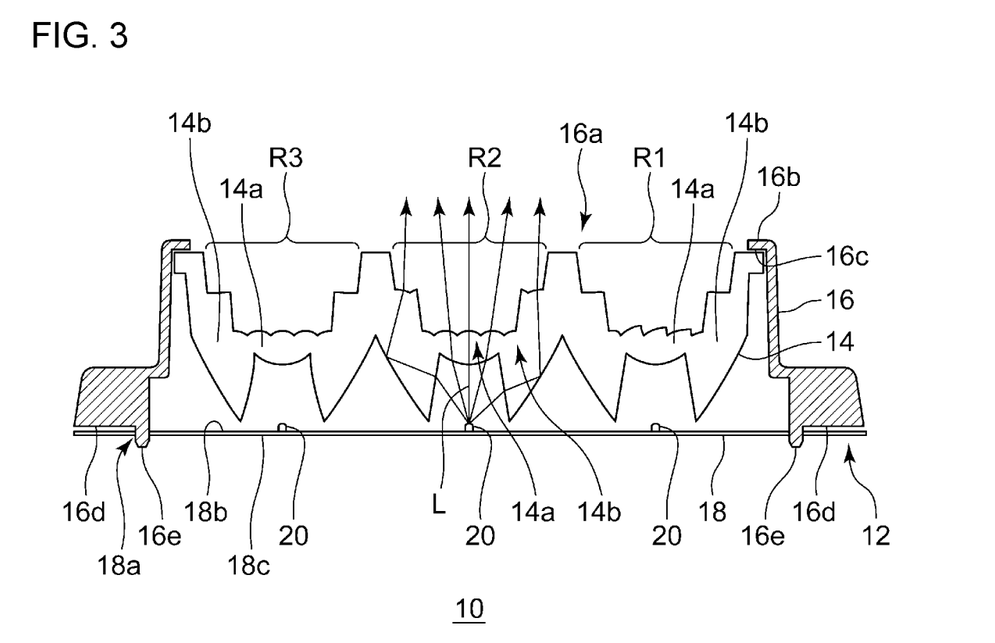
FIG. 3 is a sectional view of the vehicle lamp illustrated in FIG. 1, taken along the A-A line.

FIG. 1 is a front view of a vehicle lamp according to a first embodiment. FIG. 2 is an exploded perspective view of the vehicle lamp according to the first embodiment. FIG. 3 is a sectional view of the vehicle lamp illustrated in FIG. 1, taken along the A-A line.

A vehicle lamp 10 includes a light emitting module 12, a lens 14, and a holder 16. The light emitting module 12 includes a metal plate 18 and three semiconductor light emitting elements (light emitting diodes 20). The metal plate 18 is a plate-like member made of aluminum, copper, or the like. Each of the three semiconductor light emitting elements is mounted on the metal plate 18 and serves as a light source. The semiconductor light emitting elements may be laser elements or EL elements. The lens 14 includes three optical control regions R1 to R3, which control respective optical paths such that light L emitted from the light emitting diodes 20 enters and passes through the lens 14 to exit forward. The holder 16 holds the lens 14 with the lens 14 positioned to the holder 16. The metal plate 18 is secured to the holder 16 by three screws 19 with the metal plate 18 positioned to the holder 16.

In this manner, in the vehicle lamp 10 according to the present embodiment, the metal plate 18 and the lens 14 are positioned to the holder 16, the common member, and thus the accuracy of positioning the metal plate 18 and the lens 14 improves. As the accuracy of relative positioning of the metal plate 18 and the lens 14 improves, a desired light distribution pattern to be projected ahead of the vehicle can be formed with high accuracy.

The lens 14 does not protrude forward from an opening 16a in the holder 16, and the entirety of the lens 14 is contained within a space on the side of the opening 16a where the metal plate 18 is located. In other words, the entirety of the lens 14 is contained in a region defined by the holder 16 and the metal plate 18. Each of the optical control regions R1 to R3 of the lens 14 includes a center portion 14a and an outer edge portion 14b. The center portions 14a refract light L from their corresponding light emitting diodes 20 to allow the light L to exit forward. The outer edge portions 14b surround the respective center portions 14a. The outer edge portions 14b internally reflect light L emitted from the corresponding light emitting diodes 20 and having entered the outer edge portions 14b to allow the light L to exit forward. With this configuration, even though the lens 14 is not so shaped as to protrude from the holder, as a convex lens is, a desired light distribution pattern can be formed, and the thickness of the vehicle lamp 10 in the front-back direction of the vehicle can be reduced.

Next, positioning of the components of the vehicle lamp 10 according to the present embodiment will be described. The holder 16 includes a flange portion 16b surrounding the opening 16a. The lens 14 is secured to a positioning portion 16c provided on an inner side of the flange portion 16b. This configuration allows the lens 14 to be mounted from the back side of the holder 16 to be positioned.

The metal plate 18 includes positioning holes 18a, and positioning protrusions 16e provided on a back-side end surface 16d of the holder 16 are inserted into the respective positioning holes 18a. As the protrusions 16e are fitted into the respective positioning holes 18a, the metal plate 18 is positioned to the holder 16.

The metal plate 18 has a thickness of 1-2 mm, and its surface is blackened through anodization, painting, or the like, which improves the rate of heat dissipation from the metal plate 18. Then, owning to a combination of a feature that a surface 18c opposite a mounting surface 18b on which the light emitting diodes 20 are mounted is exposed to the outside, the improved rate of heat dissipation from the metal plate 18, a feature that the plurality of light emitting diodes 20 are disposed discretely with a space therebetween, and so on, the light emitting module 12 can satisfy a desired heat dissipation performance without the need for a heat sink for mounting the metal plate 18. Thus, the thickness of the vehicle lamp 10 in the front-back direction of the vehicle can be reduced.

Figure 4:
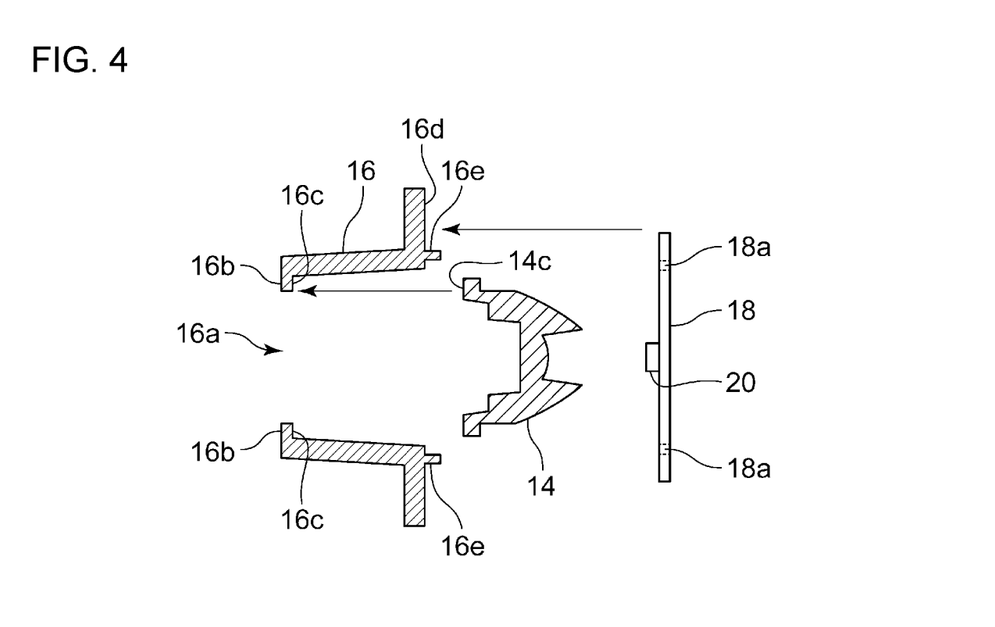
FIG. 4 is a schematic diagram for describing a method of manufacturing the vehicle lamp according to the first embodiment.

FIG. 4 is a schematic diagram for describing a method of manufacturing a vehicle lamp according to the first embodiment. FIG. 4 is an exploded view of the vehicle lamp, viewed from its side.

As illustrated in FIG. 4, the manufacturing method according to the present embodiment includes a preparation step of preparing the tubular holder 16 having the opening 16a, which allows light from the light emitting diodes 20 to exit therethrough; a lens positioning step of positioning a front end surface 14c of the lens 14 to the positioning portion 16c so formed on an inner side (the side closer to the substrate) of the opening 16a as to surround the opening 16a; and a substrate positioning step of positioning the metal plate 18 having the light emitting diodes 20 mounted thereon to securing portions (the protrusions 16e on the back-side end surface 16d) opposite the opening 16a in the holder 16.

In the lens positioning step and the substrate positioning step, the lens 14 and the metal plate 18 can be mounted to the holder 16 from the same direction. The lens 14 is welded and secured to the holder 16 by making the front end surface 14c abut the positioning portion 16c of the holder 16 and, in that state, by irradiating the abutted region with laser from the back side of the lens 14. The metal plate 18 is welded and secured to the holder 16 by making the metal plate 18 abut the back-side end surface 16d of the holder 16 and, with the protrusions 16e fitted in the respective positioning holes 18a, by irradiating the vicinity of each protrusion 16e protruding into the rear side of the metal plate 18 with laser from the back side. Alternatively, the metal plate 18 is welded and secured to the holder 16 by inserting the protrusions 16e into the respective positioning holes 18a for positioning and then by tightening them with screws or the like with use of other holes provided for securing.

According to this aspect, the lens positioning step and the substrate positioning step can be achieved through welding with use of laser emitted from the same side, and this can reduce the necessity for changing the orientation of a laser welding apparatus or for rotating components, such as the lens or the holder, during the manufacture. Furthermore, the portion where the lens 14 is welded to the holder 16 comes on the inner side (the rear side) of the flange portion 16b, and thus the welded portion is not visible from the front of the vehicle lamp 10, which leads to a better outer appearance. Light that passes through the welded portion is blocked by the flange portion 16b, and thus any uncontrolled light, such as glare, that leaks to the outside can be reduced. Alternatively, the mounting work can be done from the same side when the screws or the like are tightened. Thus, the workability improves, and an occurrence of any defect that would be caused by a mounting error can be suppressed.

[Light Emitting Module]

Figure 5:
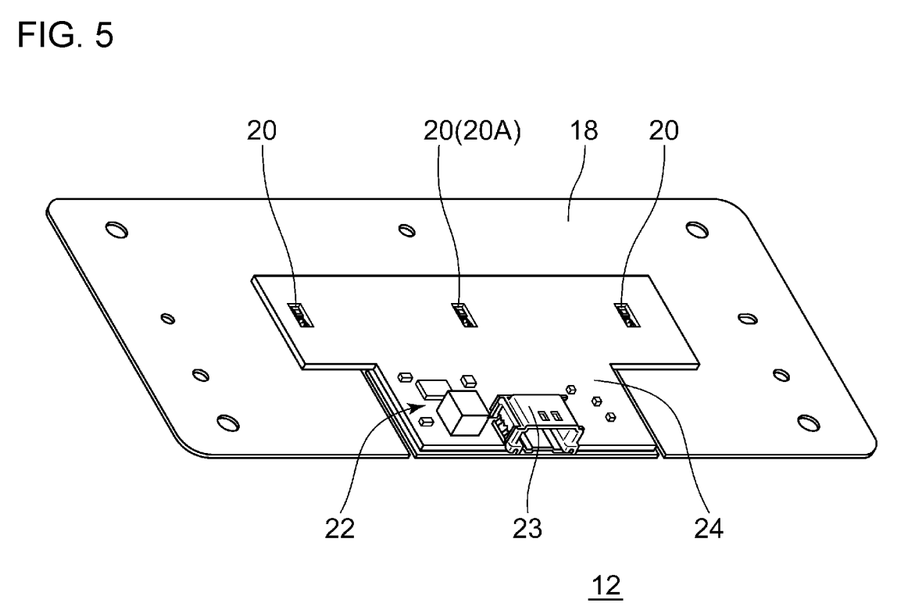
FIG. 5 is a perspective view, viewed from the above, of a light emitting module according to the first embodiment.
Figure 6:
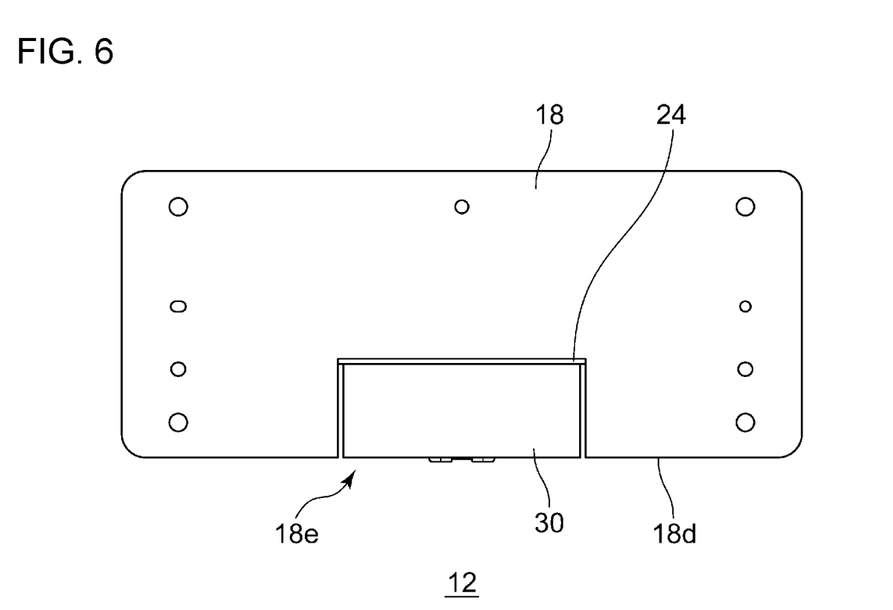
FIG. 6 is a rear view of the light emitting module according to the first embodiment.
Figure 7:
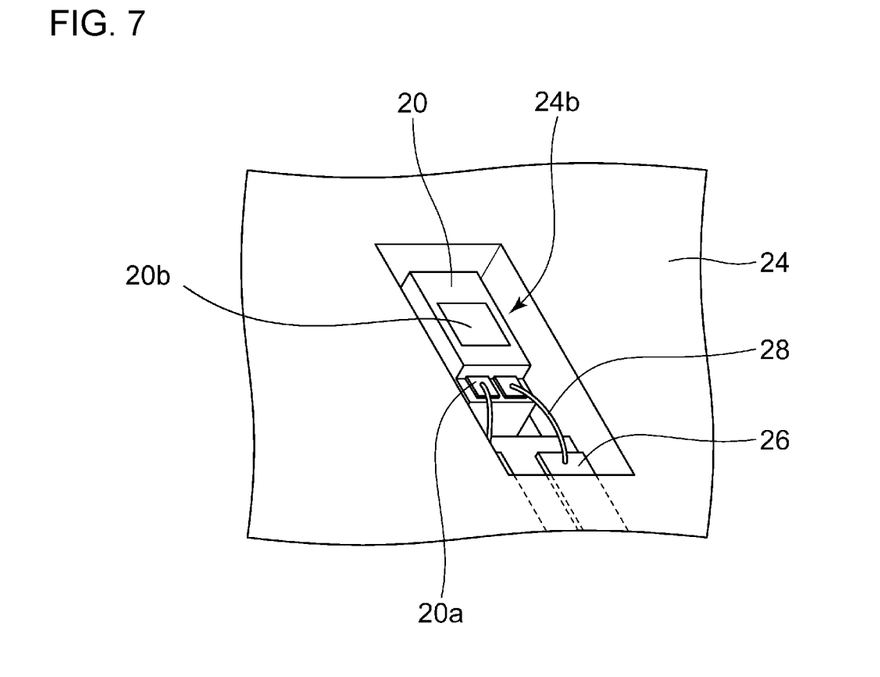
FIG. 7 is an enlarged view of the vicinity of an opening in the light emitting module illustrated in FIG. 5.
Figure 8:
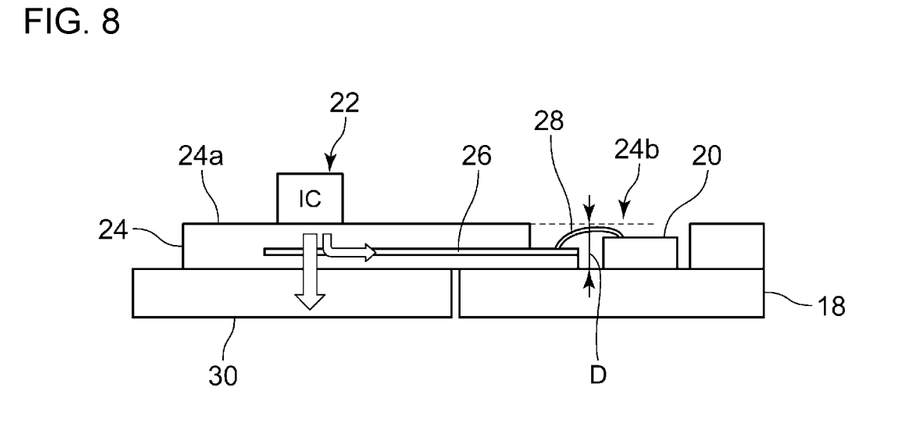
FIG. 8 is a schematic diagram of one section including the opening in the light emitting module according to the first embodiment.

Next, a preferred embodiment of a light emitting module will be described. FIG. 5 is a perspective view, viewed from the above, of the light emitting module according to the first embodiment. FIG. 6 is a rear view of the light emitting module according to the first embodiment. FIG. 7 is an enlarged view of the vicinity of an opening in the light emitting module illustrated in FIG. 5. FIG. 8 is a schematic diagram of one section including the opening in the light emitting module according to the first embodiment.

The light emitting module 12 includes the three light emitting diodes 20, a circuit board 24 provided with a lighting control circuit 22 that controls on/off of the light emitting diodes 20 and a connector 23 to be connected to an outside connector, and the metal plate 18 serving as an element metal plate on which the light emitting diodes 20 are mounted. The circuit board 24 is a multilayer resin substrate having a wiring portion 26 formed therein for connecting the light emitting diodes 20 and the lighting control circuit 22. This configuration allows the lighting control circuit 22 and the light emitting diodes 20 to be connected with a simple configuration, as illustrated in FIG. 8. The lighting control circuit 22 is so configured as to include passive elements (e.g., resistance, coil, capacitor, etc.) necessary for driving the light emitting diodes 20 and active elements (e.g., transistor, IC, diode, operational amplifier, etc.).

The circuit board 24 according to the present embodiment is a multilayer substrate having the wiring portion 26 inside and in its surface layer. For example, the circuit board 24 is a glass epoxy substrate having a copper foil pattern that serves as a wiring portion formed on the surface or inside the substrate. This configuration can lower the cost, as compared with one that is thick and requires high material and manufacturing cost, such as a power feed attachment with a built-in busbar. The circuit board may be formed of a phenolic resin or a polyimide resin. The portion of the wiring portion 26 that is exposed in an opening 24b is subjected to metal surface treatment (nickel plating treatment, gold plating treatment, or the like). This improves the bonding performance of a metal wire 28, such as a gold wire, an aluminum wire, or an aluminum ribbon. The rear-side surface layer of the circuit board 24 that comes into contact with the metal plate 18 is formed solely of an insulating material. With this configuration, not only an insulating adhesive with a high heat dissipation performance but also a conductive adhesive can be used to bond the circuit board 24 to the conductive metal plate 18.

As illustrated in FIG. 8, at least a portion of the circuit board 24 is mounted on the metal plate 18, and the wiring portion 26 is formed between the lighting control circuit 22 and the metal plate 18 in the thickness direction of the substrate. The lighting control circuit 22 is mounted on a surface 24a of the circuit board 24. With this configuration, heat produced by the components (e.g., IC) used in the lighting control circuit 22 travels not only in the thickness direction but also in the horizontal direction via the wiring portion 26 in the circuit board 24, which leads to improved heat dissipation performance.

The light emitting diodes 20 are disposed in the respective openings 24b formed in the circuit board 24. This configuration allows the light emitting diodes 20 to be mounted directly on the metal plate 18. The plurality of openings 24b are provided with a space therebetween, and the light emitting diodes 20 are disposed in the respective openings 24b. The optical control regions R1 to R3 of the lens 14 correspond to the respective light emitting diodes 20. This configuration allows a plurality of light sources of different light distributions to be provided in a single light emitting module.

Each light emitting diode 20 is connected to the wiring portion 26 via the metal wire 28. This configuration can improve the reliability of the connection between the wiring portion 26 and an electrode pad 20a of each light emitting diode 20. Furthermore, the use of the metal wire 28 can reduce the area of each electrode pad 20a. The electrode pad 20a according to the present embodiment has an area smaller than that of a light emitting surface 20b of each light emitting diode 20. When the light emitting surfaces 20b of the light emitting diodes 20 face ahead of the vehicle, thin metal wires 28 or small electrode pads 20a are less noticeable when the vehicle lamp 10 is viewed from the front.

As illustrated in FIG. 6, the light emitting module 12 further includes a circuit metal plate 30 separate from the metal plate 18. The circuit board 24 is mounted over the metal plate 18 and the circuit metal plate 30, and the metal plate 18 and the circuit metal plate 30 are thermally isolated from each other. With this configuration, the shape or the size of the metal plate 18 serving as an element metal plate can be set in consideration of heat produced by the light emitting diodes 20, and the shape or the size of the circuit metal plate 30 can be set in consideration of heat produced in the lighting control circuit 22. Thus, the configuration flexibility improves.

The metal plate 18 is a single-piece plate-like member and has a rectangular cut-out portion 18e formed in an outer peripheral portion 18d, and the rectangular circuit metal plate 30 fits in the cut-out portion 18e. The metal plate 18 and the circuit metal plate 30 fitted in the cut-out portion 18e together form a rectangular shape. This configuration allows the two metal plates together to make a simple rectangular shape, and thus interference or competing for space among members can be reduced, and the layout flexibility increases in turn.

The metal plate 18 or the circuit metal plate 30 is a metal plate having a thickness of 1-2 mm and made of aluminum, copper, or the like. Thus, the light emitting module 12 can be made thinner. As illustrated in FIG. 5, the lighting control circuit 22 that includes an element, such as an IC, with relatively large heat production is provided at a position away from, of the three light emitting diodes 20, the center light emitting diode 20A with a relatively low heat dissipation performance. This can mitigate an influence of heat produced by the lighting control circuit 22 on the light emitting diode 20A. As illustrated in FIG. 2 or 3, the region defined by the lens 14, the metal plate 18, and the holder 16 includes a certain dead space, and the components constituting the lighting control circuit 22 are disposed in this dead space. This configuration can suppress any increase, attributable to the lighting control circuit 22, in the thickness of the vehicle lamp 10 in the front-back direction of the vehicle.

Second Embodiment

Figure 9:
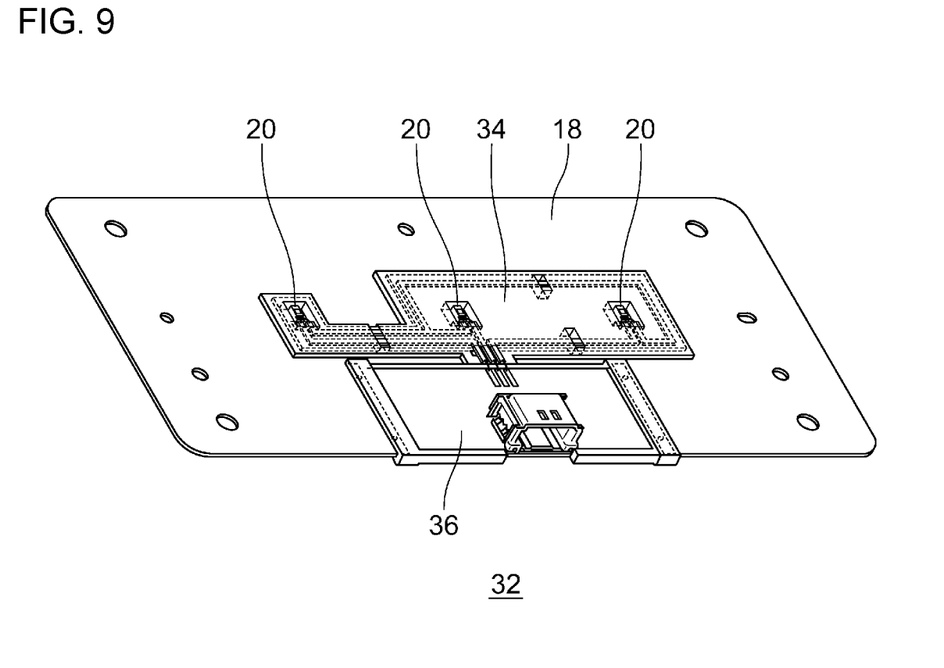
FIG. 9 is a perspective view, viewed from the above, of a light emitting module according to a second embodiment.
Figure 10:
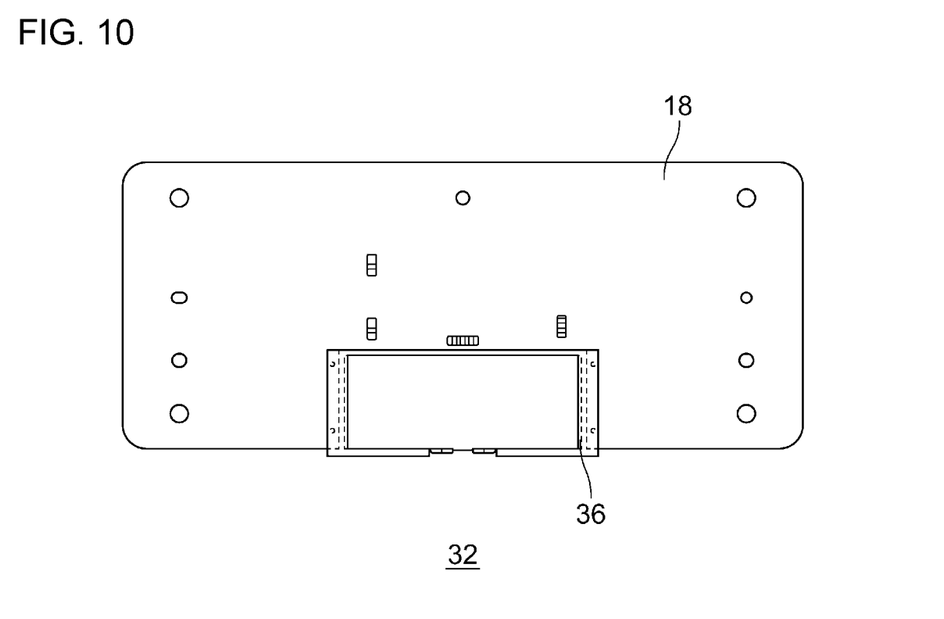
FIG. 10 is a rear view of the light emitting module according to the second embodiment.
Figure 11:
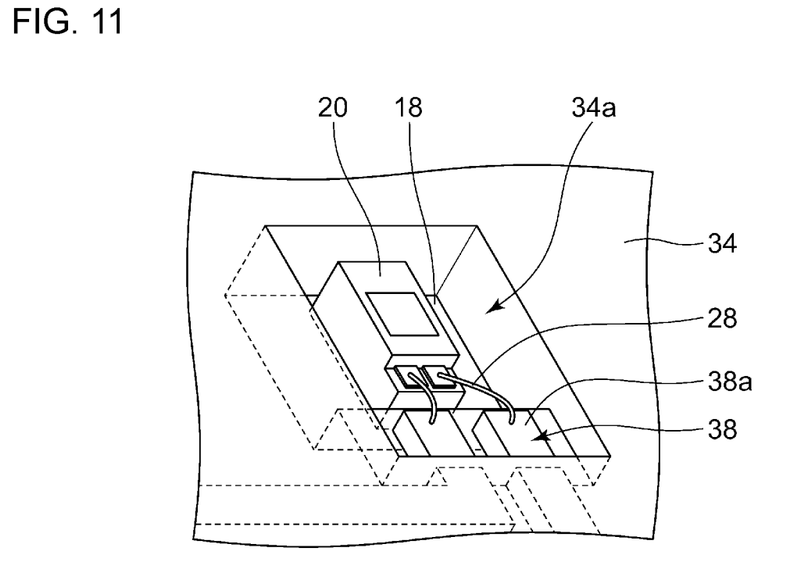
FIG. 11 is an enlarged view of the vicinity of an opening in the light emitting module illustrated in FIG. 9.
Figure 12A:
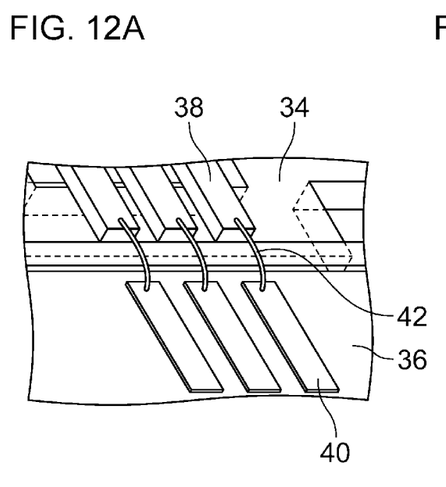
FIGS. 12A and 12B are each an enlarged view of the vicinity of a portion connecting a wiring board and a circuit board in the light emitting module according to the second embodiment.
Figure 12B:
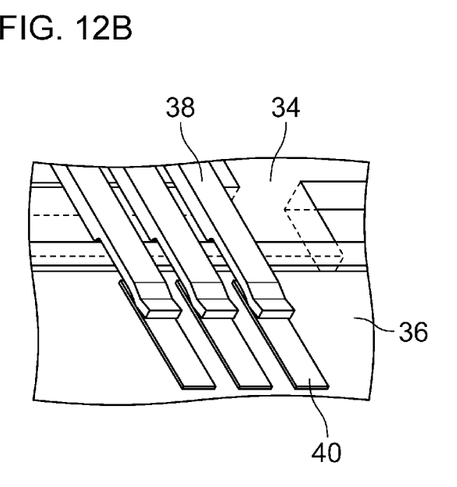

FIG. 9 is a perspective view, viewed from the above, of a light emitting module according to a second embodiment. FIG. 10 is a rear view of the light emitting module according to the second embodiment. FIG. 11 is an enlarged view of the vicinity of an opening in the light emitting module illustrated in FIG. 9. FIGS. 12A and 12B are each an enlarged view of the vicinity of a portion connecting a wiring board and a circuit board in the light emitting module according to the second embodiment.

A light emitting module 32 includes three light emitting diodes 20, a metal plate 18 serving as an element metal plate on which the light emitting diodes 20 are mounted, a wiring board 34 disposed on the metal plate 18, and a circuit board 36 provided with a lighting control circuit (not illustrated) that controls on/off of the light emitting diodes 20. The wiring board 34 includes openings 34a for mounting the light emitting diodes 20 onto the metal plate 18. A portion 38a of a wire (busbar) 38 inside the wiring board 34 is exposed through the corresponding opening 34a, and each opening 34a has a depth that allows the opening 34a to surround a metal wire 28 serving as a connecting member connecting the corresponding light emitting diode 20 and the exposed portion 38a of the wire 38.

This configuration allows the lighting control circuit and the light emitting diodes 20 to be connected with a simple configuration. Furthermore, since each opening 34a has a depth D (see FIG. 8) that allows the opening 34a to surround the metal wire 28, the metal wire 28 is less likely to come into contact with other components.

Each opening 34a is configured not to allow the metal wire 28 to protrude from the surface of the wiring board 34. This configuration prevents the metal wire 28 from coming into contact with other members that the metal wire 28 should not come into contact with, and, for example, renders is unnecessary to cover the metal wire 28 with an insulating protective resin. As a result, the cost of the light emitting module 32 can be reduced.

The wiring board 34 is a resin substrate integrated with the metal plate 18 and a metal busbar. The openings 34a are recess portions that house the respective light emitting diodes 20, and a portion of the busbar is exposed through a side wall of the recess portions. This configuration allows the metal wire 28 to be connected to the portion of the busbar without protruding from the surface of the wiring board 34. The wiring board 34 includes an exterior unit or a housing formed of engineering plastics and the busbar provided in the exterior unit or the housing. This configuration, however, is not a limiting example, and the wiring board 34 may be a multilayer resin substrate having a copper foil pattern serving as a wire buried therein.

As illustrated in FIG. 12A, the wiring board 34 and the circuit board 36 are connected to each other as an end portion of the busbar serving as the wire 38 is connected, with a metal jumper wire 42, to an end portion of a copper foil pattern serving as a wire 40 of the circuit board 36. Alternatively, as illustrated in FIG. 12B, an end portion of the wire 38 may be so formed as to extend over the wire 40 of the circuit board 36, and the wire 38 may urge the wire 40 with its elasticity. The wiring board 34 and the circuit board 36 may be a common, single-piece substrate. Such a configuration can reduce the number of substrates, and the cost of components, such as a jumper wire, connecting substrates or the assembly work can be reduced.

Third Embodiment

Figure 13A:
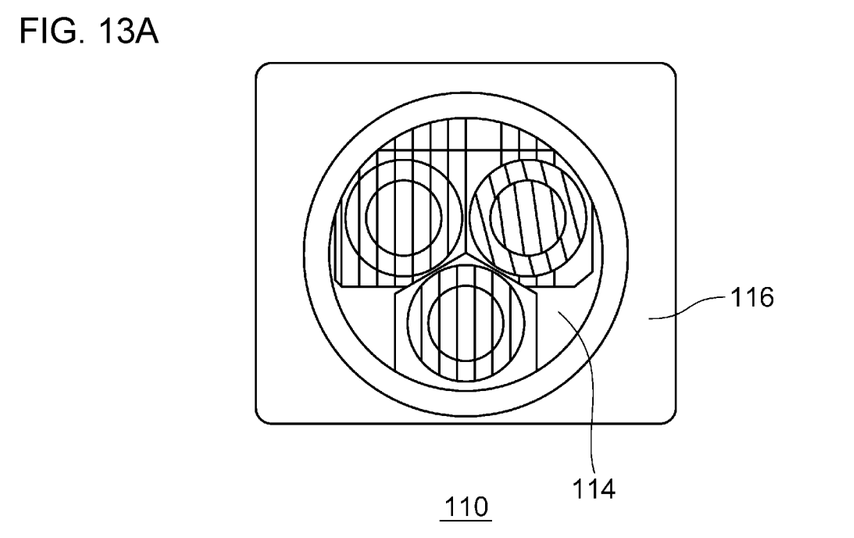
FIG. 13A is a front view of a vehicle lamp according to a third embodiment.
Figure 13B:
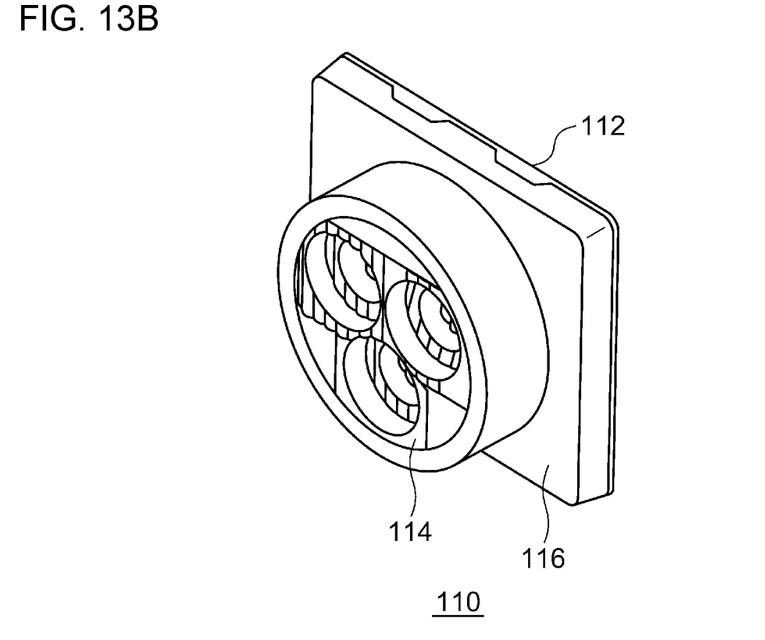
FIG. 13B is a perspective view of the vehicle lamp according to the third embodiment.
Figure 14:
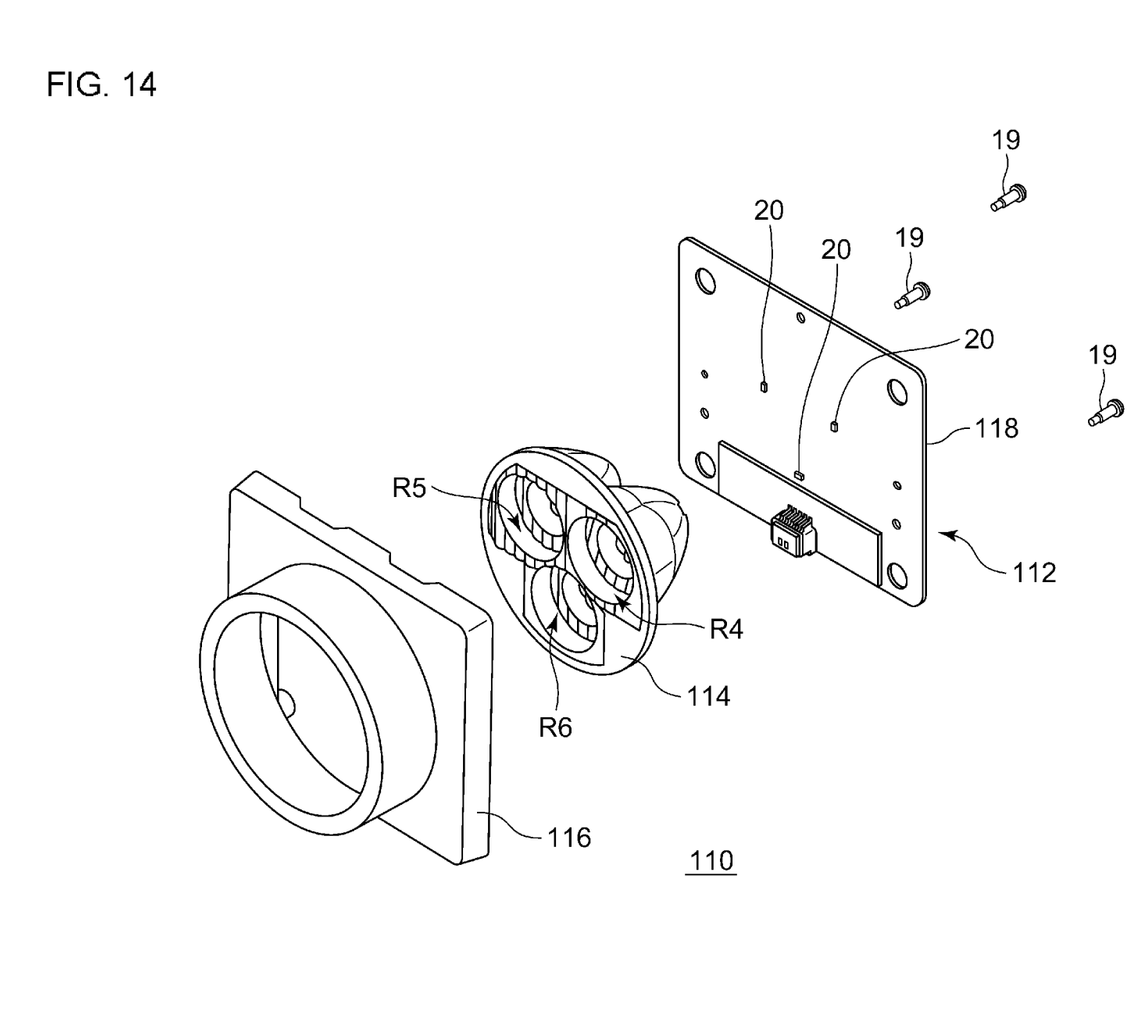
FIG. 14 is an exploded perspective view of the vehicle lamp according to the third embodiment.

FIG. 13A is a front view of a vehicle lamp according to a third embodiment, and FIG. 13B is a perspective view of the vehicle lamp according to the third embodiment. FIG. 14 is an exploded perspective view of the vehicle lamp according to the third embodiment. Components similar to those of the vehicle lamp 10 according to the first embodiment are given identical reference characters, and descriptions thereof will be omitted, as appropriate.

A vehicle lamp 110 includes a light emitting module 112, a lens 114, and a holder 116. The light emitting module 112 includes a metal plate 118 and three semiconductor light emitting elements (light emitting diodes 20). The metal plate 118 is a plate-like member made of aluminum, copper, or the like. Each of the three semiconductor light emitting elements is mounted on the metal plate 118 and serves as a light source. The three light emitting diodes 20 are disposed at the respective vertices of a triangle (right triangle or isosceles triangle).

The lens 114 includes three optical control regions R4 to R6, which control respective optical paths such that light L emitted from the light emitting diodes 20 enters and passes through the lens 114 to exit forward. The optical control regions R4 to R6 are so provided as to form a triangle ahead of the three light emitting diodes 20.

Thus far, the present invention has been described with reference to the foregoing embodiments. The present invention, however, is not limited to the foregoing embodiments, and the present invention also encompasses an embodiment obtained by combining and/or replacing components, as appropriate, of the foregoing embodiments. It is also possible to change the combinations or the order of processes in the foregoing embodiments or to add modifications, such as various design changes, to the foregoing embodiments on the basis of the knowledge of a person skilled in the art, and an embodiment obtained by adding such modifications may also be encompassed by the scope of the present invention.

What is claimed is:

1. A vehicle lamp, comprising:
    a substrate having a light source mounted thereon;
    a lens that light emitted from the light source enters and passes through to exit forward; and
    a holder that holds the lens, wherein
    the substrate and the lens are positioned to the holder,
    an entirety of the lens is provided within a region on an inner side of an opening in the holder, wherein the inner side is a side closer to the substrate,
    the lens includes
        a center portion that refracts the light emitted from the light source to allow the light to exit forward, and
        an outer edge portion surrounding the center portion, the outer edge portion configured to internally reflect light having entered the outer edge portion of the light emitted from the light source to allow the light having entered the outer edge portion to exit forward,
    the center portion mainly allows the light that is not internally reflected in the lens to exit forward,
    the outer edge portion mainly allows the light that is internally reflected in the lens to exit forward,
    the substrate includes positioning holes,
    the holder includes positioning protrusions provided on an end surface of the holder, and
    the positioning protrusions of the holder are fitted into the positioning holes of the substrate.

2. The vehicle lamp according to claim 1, wherein
    the holder includes a flange portion surrounding the opening, and
    the lens is secured to a positioning portion provided on an inner side of the flange portion.

3. The vehicle lamp according to claim 1, wherein
the substrate is a metal plate having a thickness of 1-2 mm, and
the metal plate is exposed on one surface thereof opposite a surface on which the light source is mounted.

4. A method of manufacturing a vehicle lamp, the method comprising:
preparing a tubular holder having an opening that allows light from a light source to exit therethrough;
positioning a lens to a positioning portion so formed on an inner side of the opening as to surround the opening, wherein the inner side is a side closer to the substrate; and
positioning a substrate having the light source mounted thereon to a securing portion opposite the opening in the holder, wherein
the positioning of the lens and the positioning of the substrate are performed through welding by laser emitted from the same side,
the positioning of the lens includes positioning the lens such that an entirety of the lens is provided within a region on the inner side of the opening in the holder,
the lens includes
a center portion that refracts the light emitted from the light source to allow the light to exit forward, and
an outer edge portion surrounding the center portion, the outer edge portion configured to internally reflect light having entered the outer edge portion of the light emitted from the light source to allow the light having entered the outer edge portion to exit forward,
the center portion mainly allows the light that is not internally reflected in the lens to exit forward,
the outer edge portion mainly allows the light that is internally reflected in the lens to exit forward,
the substrate includes positioning holes,
the holder includes positioning protrusions provided on an end surface of the holder, and
the positioning of the substrate includes inserting the positioning protrusions of the holder into the positioning holes of the substrate.

* * * * *